United States Patent
Ichihara

(10) Patent No.: US 9,680,389 B2
(45) Date of Patent: Jun. 13, 2017

(54) POWER CONVERSION DEVICE

(71) Applicant: Mitsubishi Electric Corporation, Tokyo (JP)

(72) Inventor: Masafumi Ichihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/031,131

(22) PCT Filed: Dec. 26, 2013

(86) PCT No.: PCT/JP2013/084896
§ 371 (c)(1),
(2) Date: Apr. 21, 2016

(87) PCT Pub. No.: WO2015/097815
PCT Pub. Date: Jul. 2, 2015

(65) Prior Publication Data
US 2016/0285382 A1    Sep. 29, 2016

(51) Int. Cl.
*H02P 3/14* (2006.01)
*H02M 5/458* (2006.01)
(Continued)

(52) U.S. Cl.
CPC ......... *H02M 5/4585* (2013.01); *H02M 5/458* (2013.01); *H02P 3/22* (2013.01);
(Continued)

(58) Field of Classification Search
CPC ... H02M 5/4585; H02M 3/1582; H02P 27/06; H02P 3/22; H02P 2201/09
(Continued)

(56) References Cited

U.S. PATENT DOCUMENTS 5,715,154 A  *  2/1998  Rault ................... H02H 9/001
                                              323/908
6,275,393 B1    8/2001  Baudelot et al.
(Continued)

FOREIGN PATENT DOCUMENTS

CN    102138278 A    7/2011
CN    102354984 A    2/2012
(Continued)

OTHER PUBLICATIONS

Taiwanese Office Action for TW Application No. 103116372 issued Jul. 27, 2015.
(Continued)

*Primary Examiner* — Bentsu Ro
*Assistant Examiner* — Thai Dinh
(74) *Attorney, Agent, or Firm* — Sughrue Mion, PLLC; Richard C. Turner

(57) ABSTRACT

A power conversion device includes a main circuit that includes a diode of which cathode is connected to a positive-side power supply path formed between a rectifier circuit and an inverter; and a switching element that is connected between an anode of the diode and a negative-side power supply path formed between the rectifier circuit and the inverter. In the main circuit, a portion between a first terminal and a second terminal, which are provided on the positive-side power supply path, is opened and a reactor is provided between the second terminal and a third terminal, which is provided at a connection point between the diode and the switching element, thus forming a boost chopper circuit.

27 Claims, 7 Drawing Sheets

(51) Int. Cl.
*H02P 3/22* (2006.01)
*H02P 27/06* (2006.01)
*H02M 1/32* (2007.01)
*H02M 3/156* (2006.01)
*H02M 7/06* (2006.01)
*H02M 1/00* (2006.01)

(52) U.S. Cl.
CPC ............... *H02P 27/06* (2013.01); *H02M 1/32* (2013.01); *H02M 3/156* (2013.01); *H02M 7/062* (2013.01); *H02M 2001/007* (2013.01)

(58) Field of Classification Search
USPC .................................. 318/376, 722, 400.21
See application file for complete search history.

(56) References Cited

U.S. PATENT DOCUMENTS

| | | | | |
|---|---|---|---|---|
| 6,353,545 | B1* | 3/2002 | Ueda | H02M 1/36 323/908 |
| 6,426,885 | B1* | 7/2002 | Sekiguchi | H02H 9/001 318/434 |
| 6,611,126 | B2* | 8/2003 | Mizuno | B29C 45/7666 264/328.1 |
| 7,170,245 | B2* | 1/2007 | Youm | H02P 3/22 318/268 |
| 7,285,927 | B2* | 10/2007 | Kuramochi | H02P 3/04 188/158 |
| 7,535,737 | B2 | 5/2009 | Mechi | |
| 7,924,586 | B2 | 4/2011 | Mechi | |
| 7,965,484 | B2* | 6/2011 | Baudesson | H02M 1/32 361/90 |
| 8,779,710 | B2* | 7/2014 | Ichihara | H02P 1/04 318/400.3 |
| 2003/0155893 | A1 | 8/2003 | Schreiber | |
| 2009/0067206 | A1* | 3/2009 | Oguchi | H02M 7/08 363/124 |
| 2009/0224704 | A1 | 9/2009 | Ibori et al. | |
| 2010/0321965 | A1* | 12/2010 | Sakakibara | H02M 7/797 363/37 |
| 2011/0132899 | A1* | 6/2011 | Shimomugi | H02M 3/1584 219/620 |
| 2012/0112550 | A1 | 5/2012 | Schill | |
| 2012/0257431 | A1* | 10/2012 | Suzuki | H02M 7/003 363/132 |
| 2013/0128633 | A1* | 5/2013 | Ichihara | H02J 7/345 363/37 |
| 2014/0203740 | A1* | 7/2014 | Ogawa | H02P 3/22 318/375 |

FOREIGN PATENT DOCUMENTS

| | | |
|---|---|---|
| DE | 10156694 B4 | 10/2005 |
| DE | 102009054971 A1 | 6/2011 |
| EP | 2451064 A2 | 5/2012 |
| JP | 03-018285 A | 1/1991 |
| JP | 05-122964 A | 5/1993 |
| JP | 06-080392 U | 11/1994 |
| JP | 07-256147 A | 10/1995 |
| JP | 08-168250 A | 6/1996 |
| JP | 10-174456 A | 6/1998 |
| JP | 11-313490 A | 11/1999 |
| JP | 2004-166441 A1 | 6/2004 |
| JP | 2012182867 A | 9/2012 |
| WO | 2004/012325 A1 | 2/2004 |
| WO | 2012/014292 A1 | 2/2012 |

OTHER PUBLICATIONS

International Search Report for PCT/JP2013/084896 dated Apr. 8, 2014.

Communication dated Jul. 18, 2016, issued by the German Patent &Trademark Office in counterpart German application No. 112013007659.4.

Communication dated Aug. 10, 2016, issued by the Korean Intellectual Property Office in corresponding Korean application No. 10-2016-7015128.

Communication dated Feb. 22, 2017 from the State Intellectual Property Office of the P.R.C. in counterpart Chinese application No. 201380081841.3, 13 pages with translation Partial.

* cited by examiner

POWER CONVERSION DEVICE

CROSS REFERENCE TO RELATED APPLICATIONS

This application is a National Stage of International Application No. PCT/JP2013/084896filed Dec. 26, 2013, the contents of all of which are incorporated herein by reference in their entirety.

FIELD

The present invention relates to a power conversion device.

BACKGROUND

A power conversion device for driving a motor rectifies alternating current supplied from an AC power source, converts rectified direct current into alternating current, and drives a motor, which generally includes a brake transistor that consumes regenerative energy generated during deceleration of the motor by allowing current to flow to an external resistor. Further, a motor-driving power conversion device is required to include a configuration that makes it operate stably even when the voltage of the AC power source fluctuates and the voltage falls and to include a configuration that makes it possible to improve the torque and output of the motor.

In the related art, a configuration has been disclosed of an electric power steering device that drives an electric power steering motor in which operations between boosting and regenerative operations can be switched while in use (for example, Patent Literature 1).

CITATION LIST

Patent Literature

Patent Literature 1: Japanese Patent Application Laid-Open No. 2004-166441

SUMMARY

Technical Problem

However, in the related art, it is premised that there is an internal boosting circuit or an internal regenerative power consuming circuit, either of which includes a switching element that is used for switching; therefore, the switching element for switching is an important component. Particularly, because the rated current needs to usually flow through a switching element provided on a DC voltage supply path, there is a problem in that the size and cost of the device increases.

The invention has been made in consideration of the above-mentioned circumstances. An objective of the invention is to provide a power conversion device that can exclusively or simultaneously perform a regenerative power consumption operation for consuming regenerative power generated by a motor and a boosting operation for boosting DC power supplied to an inverter without increasing the size and cost of the device.

Solution to Problem

In order to solve the problem and achieve the objective mentioned above, the present invention relates to a power conversion device that includes a main circuit that includes a rectifier circuit rectifying alternating current supplied from an AC power source and an inverter driving a motor. The main circuit includes a diode, a cathode of which is connected to a positive-side power supply path formed between the rectifier circuit and the inverter; a switching element that is connected between a negative-side power supply path formed between the rectifier circuit and the inverter and an anode of the diode; a first terminal that is provided on the positive-side power supply path; a second terminal that is provided on a portion of the positive-side power supply path closer to the rectifier circuit than the first terminal and is disconnected with the first terminal; a third terminal that is led from a connection point between the diode and the switching element; and a reactor that is provided between the second terminal and the third terminal. The diode, the switching element, and the reactor form a boost chopper circuit that boosts DC power supplied to the inverter.

Advantageous Effects of Invention

With the invention, a configuration including a rectifier and inverter circuit can be provided in which regenerative power is consumed by a motor during a power regeneration operation. This is done, not by providing a short circuit that shunts between a first terminal and a second terminal and a resister that connects between the first terminal and a third terminal, but by providing, as an alternative, a reactor that connects between the first terminal and the third terminal. Therefore, a configuration that boosts DC power supplied to the inverter can be provided without increasing the size and cost of the device.

DESCRIPTION OF EMBODIMENTS

Power conversion devices according to embodiments of the invention will be described below with reference to the accompanying drawings. Meanwhile, the invention is not limited to the embodiments described below.

First Embodiment

Figure 1:
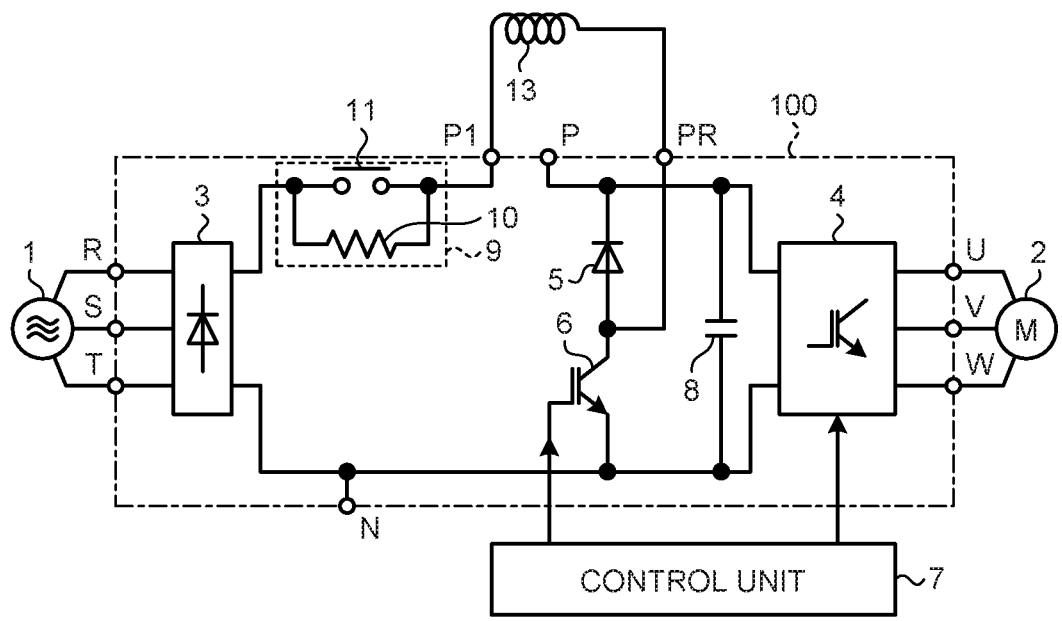
FIG. 1 is a diagram illustrating an example of the configuration of a power conversion device according to a first embodiment.
Figure 2:
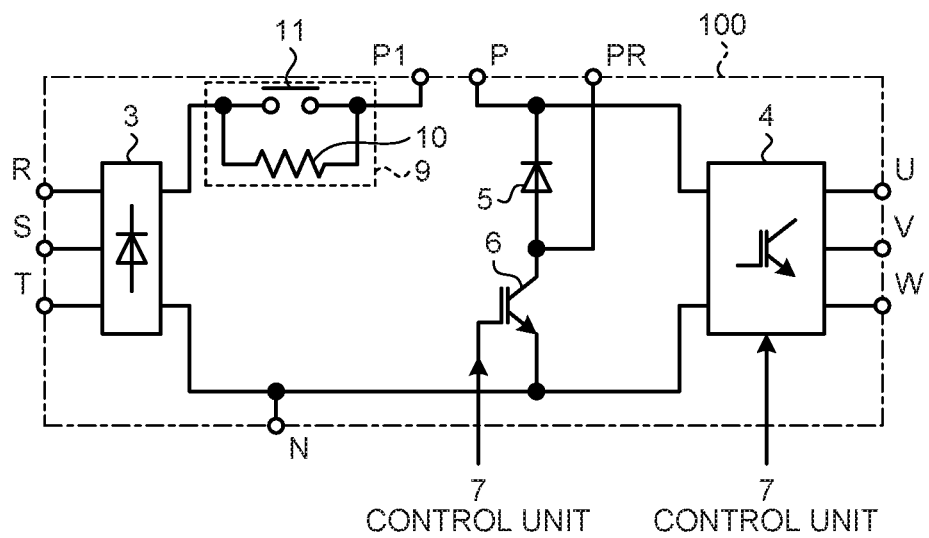
FIG. 2 is a diagram illustrating an example of the configuration of the main circuit of the power conversion device illustrated in FIG. 1.

FIG. 1 is a diagram illustrating an example of the configuration of a power conversion device according to a first embodiment. Further, FIG. 2 is a diagram illustrating an example of the configuration of the main circuit of the power conversion device illustrated in FIG. 1. As illustrated in FIG. 2, a main circuit 100 includes a rectifier circuit 3 that is formed by making a full-bridge connection of a plurality of rectifier elements and to which AC power is supplied through terminals R, S, and T; an inverter 4 that is formed by making a full-bridge connection of a plurality of switching elements and that drives a load; a diode 5, a cathode of which is connected to a positive-side power supply path connected to the inverter 4; and a switching element 6 that is connected between a negative-side power supply path formed between the rectifier circuit 3 and the inverter 4 and an anode of the diode 5. The switching element 6 can be configured from, for example, a power transistor, a power MOSFET, an IGBT, or the like.

Further, the main circuit 100 includes a P terminal (first terminal) that is provided on the positive-side power supply path formed between the rectifier circuit 3 and the inverter 4; a P1 terminal (second terminal) that is provided on a portion of the positive-side power supply path closer to the rectifier circuit 3 than the P terminal (first terminal) and is disconnected from the P terminal (first terminal); a PR terminal (third terminal) that leads from a connection point between the diode 5 and the switching element 6; and an N terminal that is provided on the negative-side power supply path formed between the rectifier circuit 3 and the inverter 4. Meanwhile, the main circuit 100 is also provided with a terminal to which a control unit 7 for controlling the inverter 4 and the switching element 6 is connected, but the terminal is not illustrated here. Furthermore, an inrush current prevention circuit 9 is provided between the P1 terminal (second terminal) and the rectifier circuit 3 in the example illustrated in FIG. 2. The inrush current prevention circuit 9 will be described below.

In the example illustrated in FIG. 1, an AC power source 1 is connected to the terminals R, S, and T and a motor 2 is connected as a load of the inverter 4 in the power conversion device according to the first embodiment. A smoothing capacitor 8, which smooths the DC voltage applied to the inverter 4, is connected to an input terminal of the inverter 4. The smoothing capacitor 8 is actually connected between the P terminal (first terminal) and the N terminal, but the illustration is simplified here for the convenience of description.

An example in which an external element is connected to the P terminal (first terminal), the P1 terminal (second terminal), and the PR terminal (third terminal) so that either of a regenerative power consumption operation for consuming regenerative energy (regenerative power) generated during the deceleration of the motor 2 and a boosting operation for boosting DC power supplied to the inverter 4 is performed will be described in the embodiment.

Figure 3:
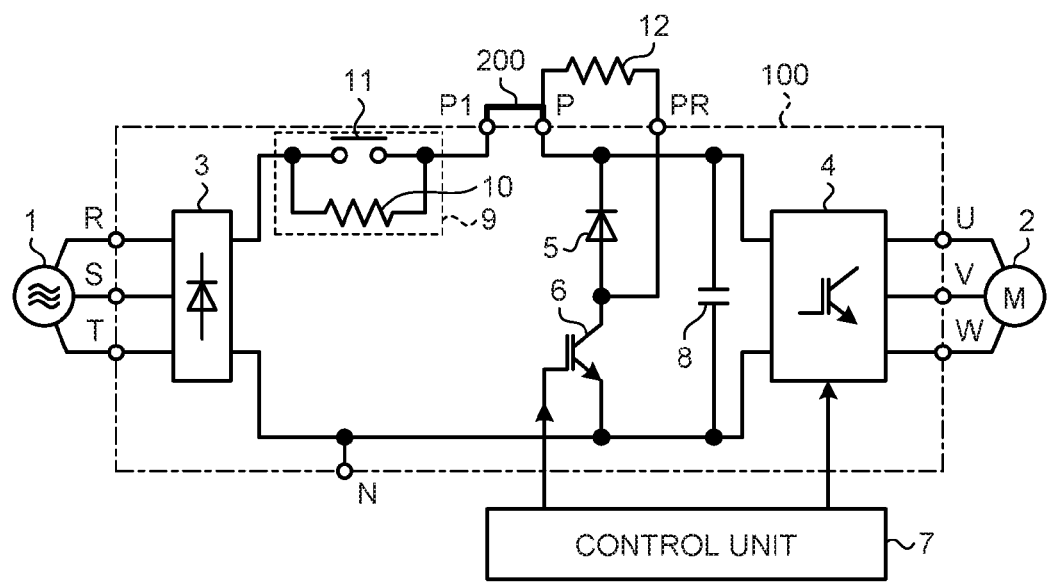
FIG. 3 is a diagram illustrating an example of the configuration of the main circuit, which has the configuration illustrated in FIG. 2, when a regenerative power consumption operation is performed.

FIG. 3 is a diagram illustrating an example of the configuration of the main circuit, which has the configuration illustrated in FIG. 2, when the regenerative power consumption operation is performed.

When the regenerative power consumption operation is performed, the P terminal (first terminal) and the P1 terminal (second terminal) are connected to each other by a short circuit 200 and a braking resistor 12 is connected between the P1 terminal (second terminal) and the PR terminal (third terminal) as illustrated in FIG. 3. The braking resistor 12 and the diode 5 and the switching element 6, which are included in the main circuit 100, form a brake circuit.

Here, the short circuit 200 may be a metal conductor, such as a copper plate or a copper wire, and may be a DC reactor for improving the power factor. It is also assumed that a reactor for suppressing high-frequency noises generated by the inverter 4 is connected. The invention is not limited to the configuration of the short circuit 200.

Further, the above-mentioned inrush current prevention circuit 9 has a function of preventing inrush current from being supplied to the smoothing capacitor 8 when the AC power source 1 is turned on. The inrush current prevention circuit 9 includes a resistor 10 for charging and a switch 11. When the AC power source 1 is turned on, the switch 11 is opened and the initial charging of the smoothing capacitor 8 is done via the resistor 10, which is a resistor for charging. Then, the switch 11 is closed so that the main circuit is normally operated.

In the regenerative power consumption operation, the control unit 7 monitors, for example, an input voltage of the inverter 4. When the input voltage exceeds a preset specified value, the control unit 7 controls the switching element 6 such that it turns on the switching element 6 and allows current to flow to the braking resistor 12, and thus regenerative power generated during the deceleration operation of the motor 2 is consumed. When the input voltage of the inverter 4 is equal to or lower than a specified value, the control unit 7 controls the switching element 6 such that it turns off the switching element 6. Accordingly, an overvoltage protection function, which is performed due to the rise of the input DC voltage of the inverter 4, is avoided. The regenerative power consumption operation, which is performed by the control unit 7, is known related art, and the invention is not limited to this method of controlling the switching element 6 during the regenerative power consumption operation.

In contrast, the power conversion device according to the first embodiment illustrated in FIG. 1 is adapted to perform a boosting operation for boosting DC power supplied to the inverter 4.

When the boosting operation is to be performed, a portion between the P terminal (first terminal) and the P1 terminal (second terminal) is opened, and a reactor 13 is connected between the P1 terminal (second terminal) and the PR terminal (third terminal) as illustrated in FIG. 1. The reactor 13 and the diode 5 and the switching element 6, included in the main circuit 100, form a boost chopper circuit.

In the boosting operation, the control unit 7 monitors, for example, an input DC voltage of the inverter 4 same as the case of the regenerative power consumption operation and boosts the DC power supplied to the inverter 4 by performing the ON-OFF control of the switching element 6 so that the input voltage becomes a preset voltage value. Meanwhile, the boosting operation, which is performed by the control unit 7, is known related art, and the invention is not limited to a method of controlling the switching element 6 in the boosting operation.

When the motor 2 is, for example, a three-phase motor that includes a three-phase stator winding having a U phase, a V phase, and a W phase and a rotor of which uses a permanent magnet, the magnetic flux of the permanent magnet intersects with the stator winding by the rotation of the rotor, so that an induced voltage is generated. The motor 2 outputs torque proportional to the current flowing in the stator winding by a potential difference between the induced voltage and a voltage output from the inverter 4. Since the output torque of the motor 2 is proportional to a value that is obtained by multiplying the current, which flows in the stator winding, by the number of turns of the stator winding, the output torque of the motor 2 can be increased by an increase of each phase current output from the inverter 4. However, the copper loss of the motor 2 or the conduction loss of the inverter 4 is increased in this case, which prevents efficiency from being improved.

Meanwhile, the output torque of the motor 2 can also be increased by the increase of the stator winding. However, in this case, a voltage output from the inverter 4 needs to be increased to maintain the same current flowing in the stator winding.

In the power conversion device according to the embodiment, it is possible to increase a voltage, which is output from the inverter 4, by boosting the input voltage of the inverter 4. Accordingly, it is possible to increase the output torque of the motor 2 without increasing each phase current, which is output from the inverter 4, by increasing the number of turns of the stator winding of the motor 2, that is, without substantially increasing the copper loss of the motor 2 or the conduction loss of the inverter 4. Therefore, it is possible to contribute to the improvement of efficiency.

Further, when the input voltage of the inverter 4 is boosted to increase each phase voltage output from the inverter 4, current flowing in the stator winding can be reduced to obtain the same output torque as the output torque of the configuration in which the boosting operation is not performed. Accordingly, since the wire diameter of the stator winding can be reduced, it is possible to contribute to the reduction of the size of the motor 2 and the reduction of the diameter of a wire up to the motor.

Furthermore, when the input voltage of the inverter 4 is to be changed, that is, a boosting ratio is to be changed according to the output torque required for the motor 2, the output voltage of the inverter 4 can be adjusted to a value corresponding to the output torque required for the motor 2.

Further, when, for example, a voltage supplied from the AC power source 1 is lowered, the value of the output voltage of the rectifier circuit 3 is also reduced. However, it is also possible to compensate for the reduced value of the output voltage with the increase of the voltage, which can widely cope with the value of the voltage supplied from the AC power source 1.

Figure 4:
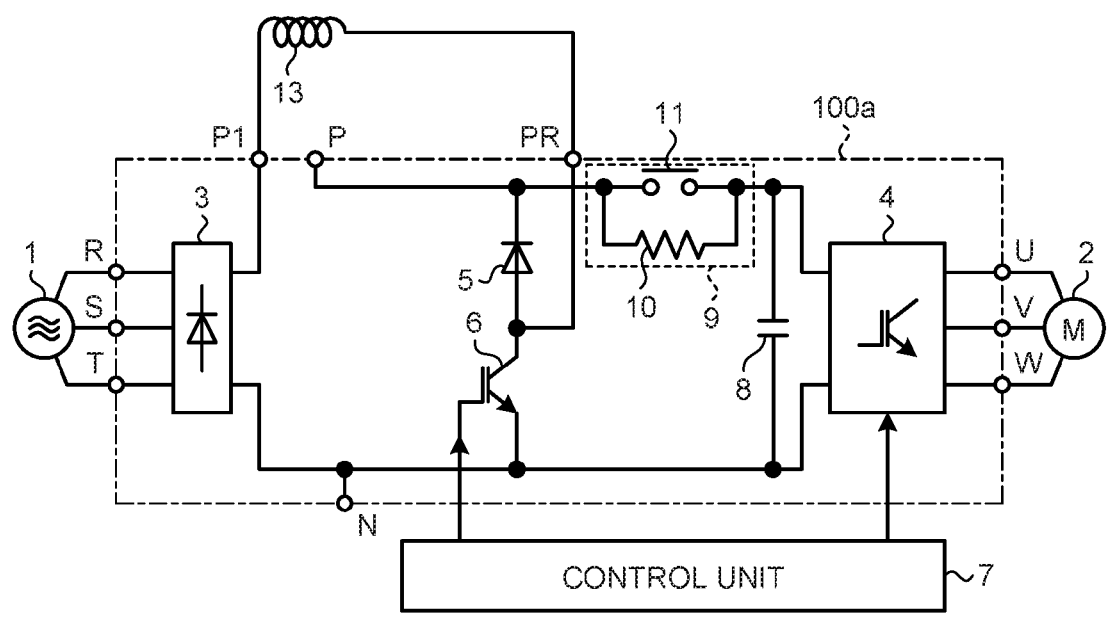
FIG. 4 is a diagram illustrating a different example to that of FIG. 1 of the power conversion device according to the first embodiment.
Figure 5:
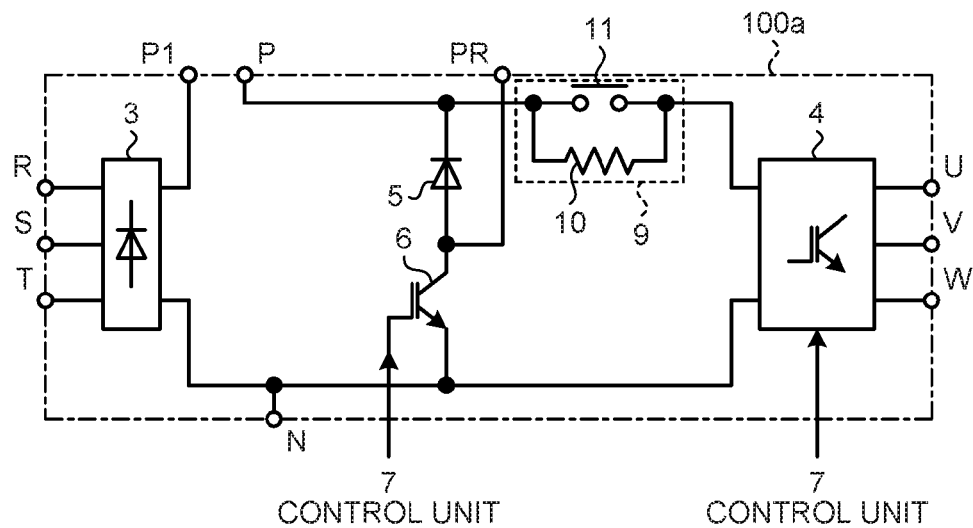
FIG. 5 is a diagram illustrating an example of the configuration of the main circuit of the power conversion device illustrated in FIG. 4.

FIG. 4 is a diagram illustrating a different example to that of FIG. 1 of the power conversion device according to the first embodiment. Further, FIG. 5 is a diagram illustrating an example of the configuration of the main circuit of the power conversion device illustrated in FIG. 4. Furthermore, FIG. 6 is a diagram illustrating an example of the configuration of the main circuit, which has the configuration illustrated in FIG. 5, when a regenerative power consumption operation is performed.

Figure 6:
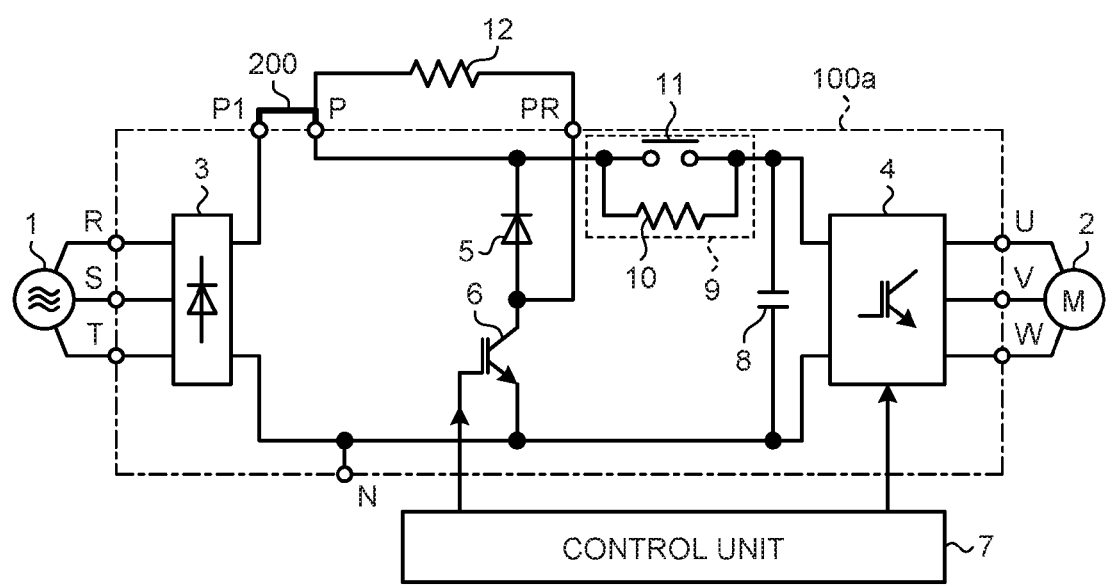
FIG. 6 is a diagram illustrating an example of the configuration of the main circuit, which has the configuration illustrated in FIG. 5, when a regenerative power consumption operation is performed.

Even in the case of a configuration of a main circuit 100a in which the inrush current prevention circuit 9 is provided closer to the inverter 4 than the P terminal (first terminal) of the positive-side power supply path as illustrated in FIG. 5, a regenerative power consumption operation can be configured to be performed when the P terminal (first terminal) and the P1 terminal (second terminal) are connected to each other by the short circuit 200 and the braking resistor 12 is connected between the P terminal (first terminal) and the PR terminal (third terminal) as illustrated in FIG. 6 so that a brake circuit is formed. Further, a boosting operation can be performed when a portion between the P terminal (first terminal) and the P1 terminal (second terminal) is opened and the reactor 13 is connected between the P1 terminal (second terminal) and the PR terminal (third terminal) as illustrated in FIG. 4, so that a boost chopper circuit can be configured.

As described above, according to the power conversion device of the first embodiment, the main circuit is configured to include the rectifier circuit that rectifies alternating current supplied from the AC power source; the inverter that drives the motor; the diode of which cathode is connected to the positive-side power supply path formed between the rectifier circuit and the inverter; and the switching element that is connected between the negative-side power supply path formed between the rectifier circuit and the inverter and the anode of the diode. In this configuration, the P terminal (first terminal) is provided on the positive-side power supply path, the P1 terminal (second terminal) is provided on a portion of the positive-side power supply path closer to the rectifier circuit than the P terminal (first terminal) and is disconnected from the P terminal (first terminal), and the PR terminal (third terminal) is led from the connection point between the diode and the switching element. When the regenerative power consumption operation for consuming regenerative power generated by the motor is adapted to be performed without increasing the size of the device and the cost of the device, it is possible to perform the boosting operation for boosting DC power, which is supplied to the inverter, by providing the reactor that connects the P1 terminal (second terminal) to the PR terminal (third terminal) instead of providing the short circuit that performs short-circuiting between the P terminal (first terminal) and the P1 terminal (second terminal) and the resistor that connects the P terminal (first terminal) to the PR terminal (third terminal).

Meanwhile, the inrush current prevention circuit has been provided on the positive-side power supply path formed between the rectifier circuit and the inverter in the above-mentioned first embodiment, but it goes without saying that the inrush current prevention circuit may be provided on the negative-side power supply path formed between the rectifier circuit and the inverter.

Second Embodiment

Figure 7:
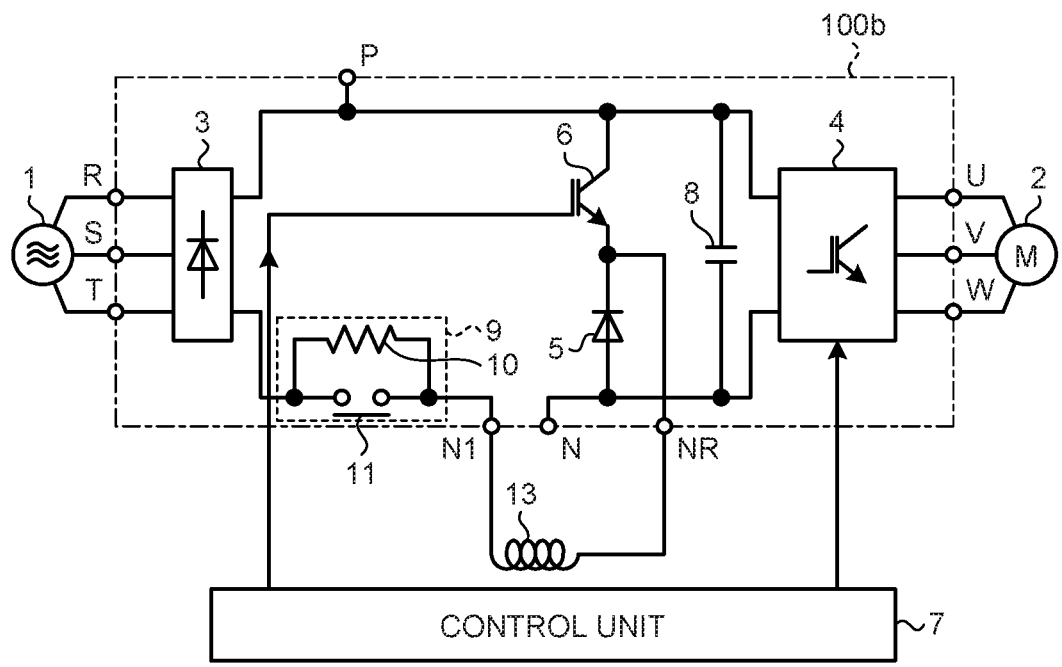
FIG. 7 is a diagram illustrating an example of the configuration of a power conversion device according to a second embodiment.
Figure 8:
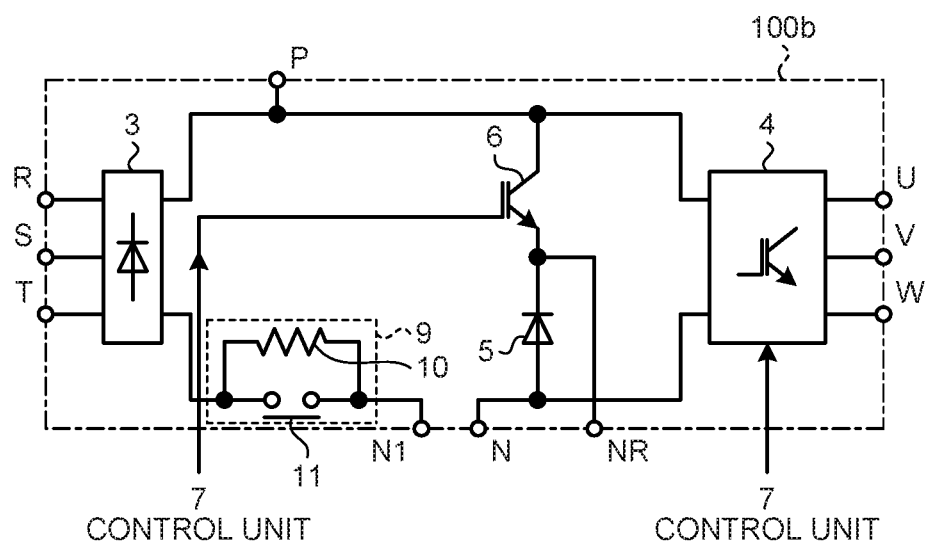
FIG. 8 is a diagram illustrating an example of the configuration of the main circuit of the power conversion device illustrated in FIG. 7.
Figure 9:
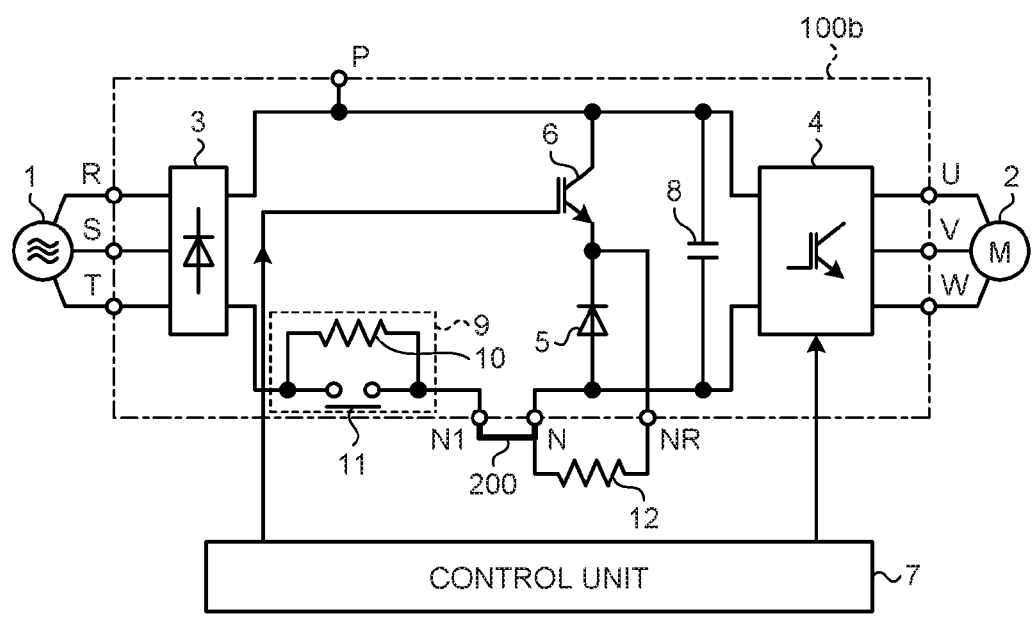
FIG. 9 is a diagram illustrating an example of the configuration of the main circuit, which has the configuration illustrated in FIG. 8, when a regenerative power consumption operation is performed.

FIG. 7 is a diagram illustrating an example of the configuration of a power conversion device according to a second embodiment. FIG. 8 is a diagram illustrating an example of the configuration of the main circuit of the power conversion device illustrated in FIG. 7. FIG. 9 is a diagram illustrating an example of the configuration of the main circuit, which has the configuration illustrated in FIG. 8, when a regenerative power consumption operation is performed. In a main circuit 100b illustrated examples in FIGS. 7, 8, and 9, an anode of a diode 5 is connected to a negative-side power supply path; and a switching element 6 is connected between a positive-side power supply path which is formed between a rectifier circuit 3 and an inverter 4 and a cathode of the diode 5.

Further, the main circuit 100b includes an N terminal (first terminal) that is provided on the negative-side power supply path formed between the rectifier circuit 3 and the inverter 4; an N1 terminal (second terminal) that is provided on a portion of the negative-side power supply path closer to the rectifier circuit 3 than the N terminal (first terminal) and is disconnected from the N terminal (first terminal); an NR terminal (third terminal) that is led from a connection point between the diode 5 and the switching element 6; and a P terminal that is provided on the positive-side power supply path formed between the rectifier circuit 3 and the inverter 4. Meanwhile, in the example illustrated in FIG. 8, a terminal to which control unit 7 for controlling the inverter 4 and the switching element 6 is connected is not illustrated the same as in the first embodiment. Furthermore, in the example illustrated in FIG. 8, an inrush current prevention circuit 9 is provided on the negative-side power supply path between the N1 terminal (second terminal) and the rectifier circuit 3.

The embodiment will be described as an example in which an external element is connected to the N terminal (first terminal), the N1 terminal (second terminal), and the NR terminal (third terminal), so that either of a regenerative power consumption operation for consuming regenerative energy generated during the deceleration of the motor 2 and a boosting operation for boosting DC power supplied to the inverter 4 is performed.

When the regenerative power consumption operation is to be performed, the N terminal (first terminal) and the N1 terminal (second terminal) are connected to each other by a short circuit 200, and a braking resistor 12 is connected between the N terminal (first terminal) and the NR terminal (third terminal) as illustrated in FIG. 9. The braking resistor 12 and the diode 5 and the switching element 6, which are included in the main circuit 100b, form a brake circuit.

The same regenerative power consumption operation as the configuration of FIG. 3 described in the first embodiment can be performed even in the configuration illustrated in FIG. 9.

As illustrated in FIG. 7, when the boosting operation is to be performed, a portion between the N terminal (first terminal) and the N1 terminal (second terminal) is opened and a reactor 13 is connected between the N1 terminal (second terminal) and the NR terminal (third terminal). The reactor 13 and the diode 5 and the switching element 6, which are included in the main circuit 100b, form a boost chopper circuit.

The same boosting operation as the configuration of FIG. 1 described in the first embodiment can be performed even in the configuration illustrated in FIG. 7.

Figure 10:
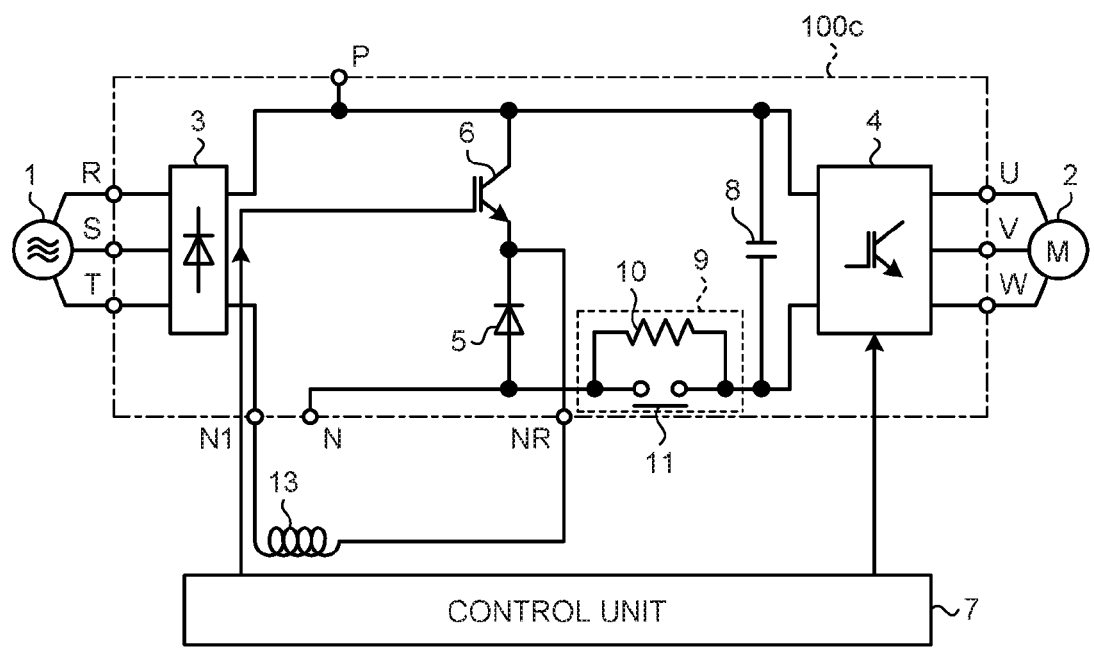
FIG. 10 is a diagram illustrating a different example to that of FIG. 7 of the power conversion device according to the second embodiment.
Figure 11:
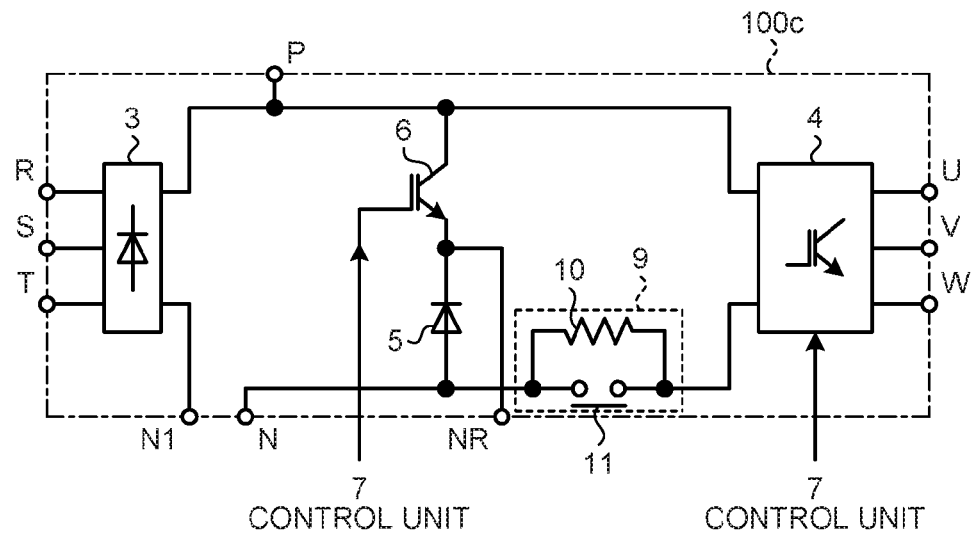
FIG. 11 is a diagram illustrating an example of the configuration of a main circuit of the power conversion device illustrated in FIG. 10.

FIG. 10 is a diagram illustrating a different example to that of FIG. 7 of the power conversion device according to the second embodiment. Further, FIG. 11 is a diagram illustrating an example of the configuration of a main circuit of the power conversion device illustrated in FIG. 10. Furthermore, FIG. 12 is a diagram illustrating an example of the configuration of the main circuit, which has the configuration illustrated in FIG. 11 when a regenerative power consumption operation is performed.

Figure 12:
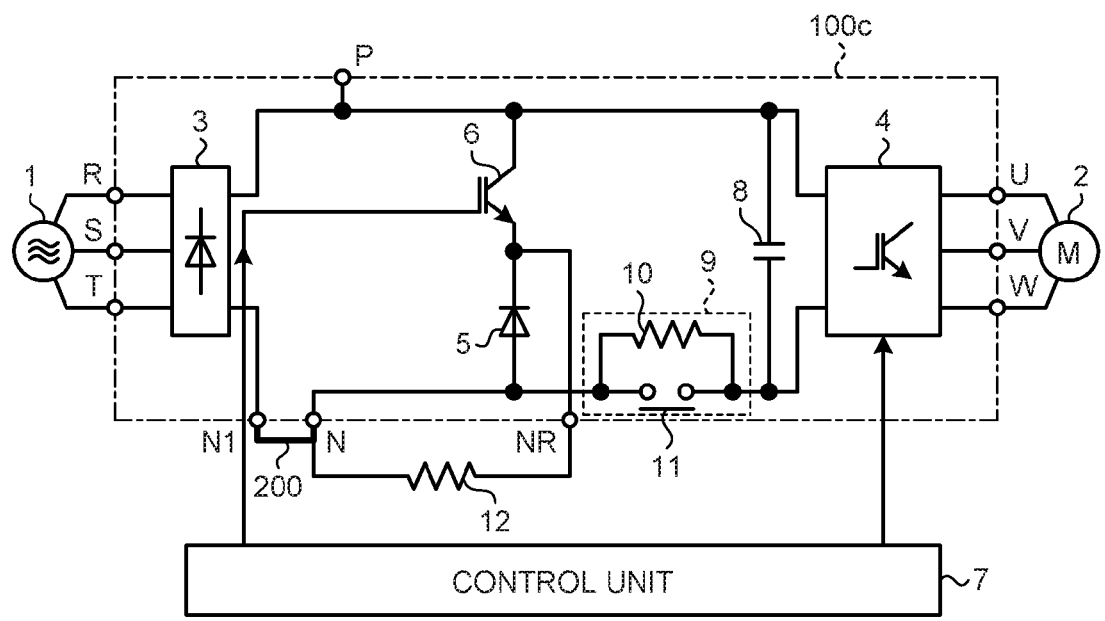
FIG. 12 is a diagram illustrating an example of the configuration of the main circuit, which has the configuration illustrated in FIG. 11, when a regenerative power consumption operation is performed.

Even in a configuration of a main circuit 100c in which the inrush current prevention circuit 9 is provided closer to the inverter 4 than the N terminal (first terminal) of the negative-side power supply path as illustrated in FIG. 11, a regenerative power consumption operation can be adapted to be performed when the N terminal (first terminal) and the N1 terminal (second terminal) are connected to each other by the short circuit 200 and the braking resistor 12 is connected between the N terminal (first terminal) and the NR terminal (third terminal) as illustrated in FIG. 12 so that a brake circuit is formed. Further, a boosting operation can be configured to be performed when a portion between the N terminal (first terminal) and the N1 terminal (second terminal) is opened and the reactor 13 is connected between the N1 terminal (second terminal) and the NR terminal (third terminal) as illustrated in FIG. 10, thus, a boost chopper circuit is formed.

As described above, according to the power conversion device of the second embodiment, the main circuit includes the rectifier circuit that rectifies alternating current supplied from the AC power source; the inverter that drives the motor; the diode of which anode is connected to the negative-side power supply path formed between the rectifier circuit and the inverter; the switching element that is connected between the positive-side power supply path formed between the rectifier circuit and the inverter and the cathode of the diode; the N terminal (first terminal) that is provided on the negative-side power supply path; the N1 terminal (second terminal) that is provided on a portion of the negative-side power supply path closer to the rectifier circuit than the N terminal (first terminal) and is disconnected from the N terminal (first terminal); and the NR terminal (third terminal) that is led from the connection point between the diode and the switching element. When the regenerative power consumption operation for consuming regenerative power generated by the motor is adapted to be performed, it is possible to perform the boosting operation for boosting DC power, which is supplied to the inverter, by providing the reactor that connects the N1 terminal (second terminal) to the NR terminal (third terminal) instead of providing the short circuit that performs short-circuiting between the N terminal (first terminal) and the N1 terminal (second terminal) and the resistor that connects the N terminal (first terminal) to the NR terminal (third terminal), without increasing the size of the device and the cost of the device.

Meanwhile, the inrush current prevention circuit has been provided on the negative-side power supply path formed between the rectifier circuit and the inverter in the above-mentioned second embodiment. However, the inrush current prevention circuit can reasonably be provided on the positive-side power supply path formed between the rectifier circuit and the inverter.

Third Embodiment

Figure 13:
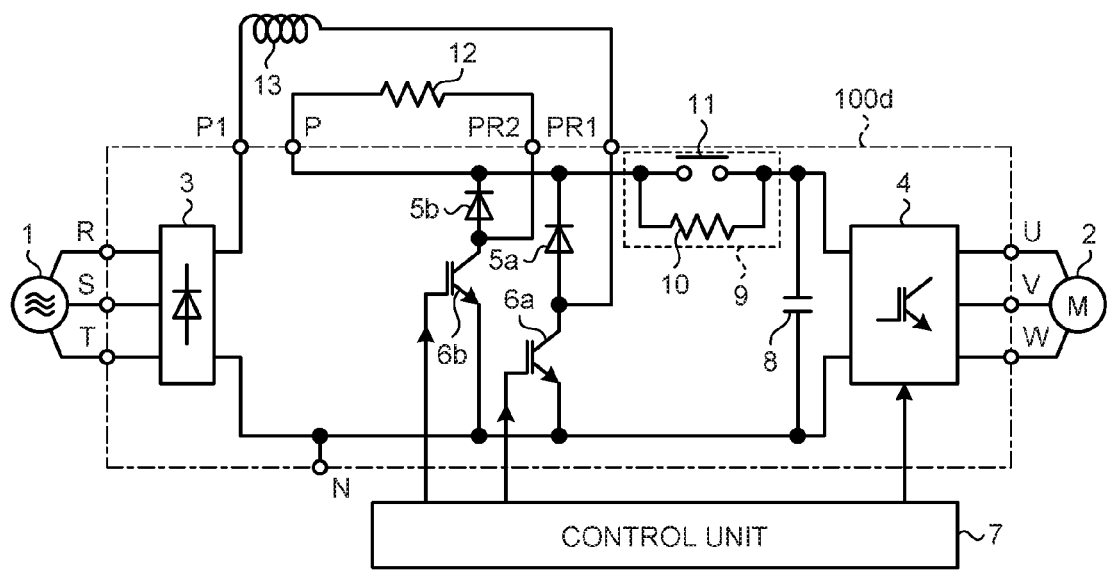
FIG. 13 is a diagram illustrating an example of the configuration of a power conversion device according to a third embodiment.

FIG. 13 is a diagram illustrating an example of the configuration of a power conversion device according to a third embodiment. In the example illustrated in FIG. 13, a main circuit 100d includes a first diode 5a and a second diode 5b, cathodes of which are connected to a positive-side power supply path connected to an inverter 4, a first switching element 6a that is connected between an anode of the first diode 5a and a negative-side power supply path connected to the inverter 4, and a second switching element 6b that is connected between the negative-side power supply path connected to the inverter 4 and an anode of the second diode 5b, instead of being provided with the diode 5 and the switching element 6 that have been described in the first and second embodiments.

Further, in the example illustrated in FIG. 13, a PR1 terminal (third terminal) is provided at a connection point between the first diode 5a and the first switching element 6a; and a PR2 terminal (fourth terminal) is provided at a connection point between the second diode 5b and the second switching element 6b.

Furthermore, an inrush current prevention circuit 9 has been provided closer to the inverter 4 than a P terminal (first terminal) of the positive-side power supply path in the example illustrated in FIG. 13, but it can reasonably configured that the inrush current prevention circuit 9 may be provided closer to the rectifier circuit 3 than a P1 terminal (second terminal) of the positive-side power supply path as in the above-mentioned first embodiment and may be provided on the negative-side power supply path formed between the rectifier circuit 3 and the inverter 4.

In the embodiment, as illustrated in FIG. 13, a portion between the P terminal (first terminal) and the P1 terminal (second terminal) is opened and a braking resistor 12 is connected between the P terminal (first terminal) and the PR2 terminal (fourth terminal) so that a brake circuit is formed, and a reactor 13 is connected between the P1 terminal (second terminal) and the PR1 terminal (third terminal) so that a boost chopper circuit is formed. Accordingly, it is possible to perform both the regenerative power consumption operation and the boosting operation.

Figure 14:
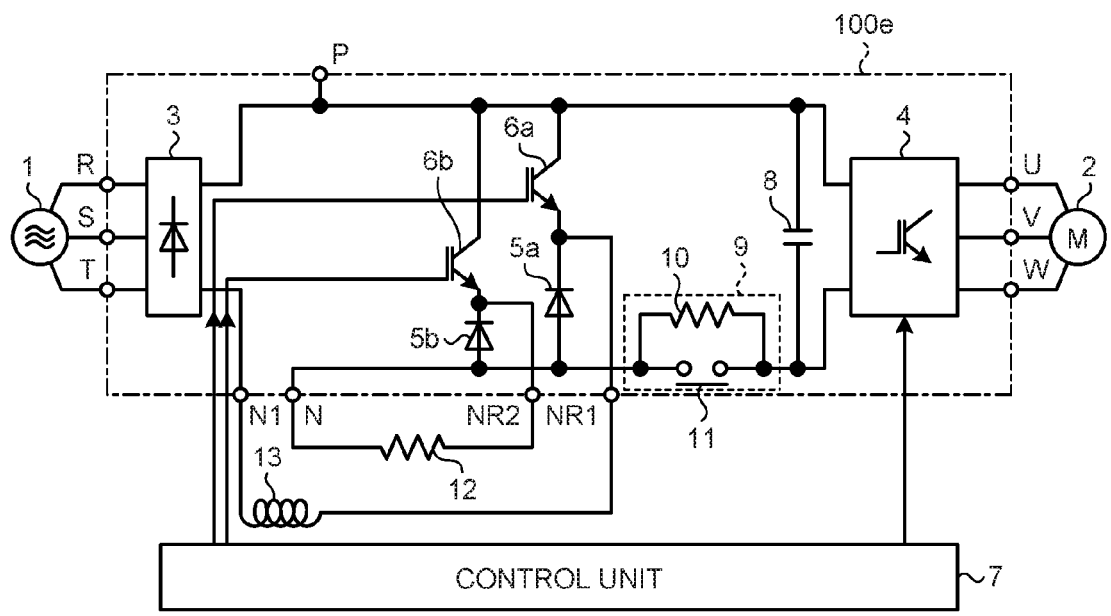
FIG. 14 is a diagram illustrating a different example than that of FIG. 13 of the configuration of the power conversion device according to the third embodiment.

FIG. 14 is a diagram illustrating a different example than that of FIG. 13 of the configuration of the power conversion device according to the third embodiment. In the example illustrated in FIG. 14, in a main circuit 100e, the anodes of the first diode 5a and the second diode 5b are connected to the negative-side power supply path connected to the inverter 4; the first switching element 6a is connected between the cathode of the first diode 5a and the positive-side power supply path connected to the inverter 4; and the second switching element 6b is connected between the positive-side power supply path connected to the inverter 4 and the cathode of the second diode 5b.

Further, in the example illustrated in FIG. 14, an NR1 terminal (third terminal) is provided at a connection point between the first diode 5a and the first switching element 6a, and an NR2 terminal (fourth terminal) is provided at a connection point between the second diode 5b and the second switching element 6b.

Furthermore, the inrush current prevention circuit 9 has been provided closer to the inverter 4 than the N terminal (first terminal) of the negative-side power supply path in the example illustrated in FIG. 14, but it goes without saying that the inrush current prevention circuit 9 may be provided closer to the rectifier circuit 3 than the N1 terminal (second terminal) of the negative-side power supply path as in the above-mentioned second embodiment and may be provided on the positive-side power supply path formed between the rectifier circuit 3 and the inverter 4.

Even in the example illustrated in FIG. 14, a portion between the N terminal (first terminal) and the N1 terminal (second terminal) is opened and a braking resistor 12 is connected between the N terminal (first terminal) and the NR2 terminal (fourth terminal) so that a brake circuit is formed, and a reactor 13 is connected between the N1 terminal (second terminal) and the NR1 terminal (third terminal) so that a boost chopper circuit is formed. Accordingly, it is possible to perform both the regenerative power consumption operation and the boosting operation as in the example illustrated in FIG. 13.

As described above, according to the power conversion device of the third embodiment, the boost chopper circuit and the brake circuit can be simultaneously formed by the connection of an external element in the main circuit including the rectifier circuit that rectifies alternating current, supplied from the AC power source and the inverter that drives the motor. Accordingly, it is possible to perform both the regenerative power consumption operation and the boosting operation of the motor without increasing the size of the device and the cost of the device.

Meanwhile, a Si-based semiconductor using silicon (Si) as a material is generally used as the diode or the switching element of the main circuit in the above-mentioned embodiments, but it goes without saying that a wide band gap (WBG) semiconductor using silicon carbide (SiC), gallium nitride (GaN), or diamond as material may be used.

The diode and the switching element, which are formed of the WBG semiconductors, have high voltage resistance and high allowable current density. For this reason, since it is possible to form power semiconductor modules, which are further reduced in size by applying the diode and the switching element, it is possible to reduce the size of the power conversion device by using these power semiconductor modules reduced in size.

Further, the diode and the switching element, which are formed of the WBG semiconductors, also have high heat resistance. For this reason, since radiation fins of a heat sink of a power conversion device can be formed smaller, the power conversion device can be further reduced in size.

Furthermore, the diode and the switching element, which are formed of the WBG semiconductors, have a low power loss. For this reason, it is possible to improve the efficiency of the diode and the switching element. Eventually, it is possible to improve the efficiency of a power semiconductor module and a power conversion device.

Meanwhile, it is preferable that all of the diode and the switching element of the power semiconductor module are formed of WBG semiconductors. Since the switching element of the least the boost chopper circuit or the brake circuit is configured from a WBG semiconductor in the above-mentioned embodiments, high-speed switching control can be performed. Accordingly, accurate boosting control or a regenerated power consumption operation can be performed. Meanwhile, when other diodes or switching elements are formed of WBG semiconductors, the same effects can be obtained. In addition, each switching element of the inverter may be formed of a WBG semiconductor. Accordingly, it is understood that the efficiency of the power semiconductor module and the power conversion device can be further improved.

Further, a power transistor, a power MOSFET, and an IGBT are described as examples of the switching elements in the above-mentioned embodiments. However, even though a MOSFET (Metal-Oxide-Semiconductor Field-Effect Transistor) having a super junction structure, which includes a P layer deeper than that of a normal MOSFET and has high withstanding voltage capacity while having low-on resistance by the wide contact between the deep P layer and an n layer and is known as a highly efficient switching element; an insulated gate semiconductor device; a bipolar transistor; or the like is used as the switching element. In this case, the same effects can be obtained and a loss can be further reduced. Accordingly, it is possible to provide a highly efficient power semiconductor module and a highly efficient power conversion device.

Meanwhile, it goes without saying that the configuration described in the above-mentioned embodiments is an example of the configuration of the invention and can also be combined with other known techniques and a part of the configuration can also be omitted or modified without departing from the scope of the invention.

INDUSTRIAL APPLICABILITY

As described above, the invention is useful as a technique that realizes a regenerative power consumption operation and a boosting operation of a motor without increasing the size of the device and the cost of the device in the configuration formed by a rectifier circuit and an inverter circuit, and is appropriate as configuration that can be applied, particularly, when an input voltage needs to be widely coped with, or when an influence of the fluctuation of a voltage needs to be considered.

REFERENCE SIGNS LIST

1 AC POWER SOURCE, 2 MOTOR, 3 RECTIFIER CIRCUIT, 4 INVERTER, 5 DIODE, 5a FIRST DIODE, 5b SECOND DIODE, 6 SWITCHING ELEMENT, 6a FIRST SWITCHING ELEMENT, 6b SECOND SWITCHING ELEMENT, 7 CONTROL UNIT, 8 SMOOTHING CAPACITOR, 9 INRUSH CURRENT PREVENTION CIRCUIT, 10 RESISTOR FOR CHARGING, 11 SWITCH, 12 BRAKING RESISTOR, 13 REACTOR, 100, 100a, 100b, 100c, 100d, 100e MAIN CIRCUIT, 200 SHORT CIRCUIT.

The invention claimed is:
1. A power conversion device comprising:
a main circuit including:
a rectifier circuit to rectify alternating current supplied from an AC power source;
an inverter to drive a motor;
a diode, a cathode of which is connected to a positive-side power supply path formed between the rectifier circuit and the inverter;
a switching element that is connected between a negative-side power supply path formed between the rectifier circuit and the inverter and an anode of the diode;
a first terminal that is provided on the positive-side power supply path;
a second terminal that is provided on a portion of the positive-side power supply path closer to the rectifier circuit than the first terminal and is configured to be directly connected to or disconnected from the first terminal by closing or opening the portion of the positive-side power supply path between the second terminal and the first terminal, respectively; and
a third terminal that is led from a connection point between the diode and the switching element,
wherein a reactor is connected with the main circuit between the second terminal and the third terminal when the second terminal is disconnected from the first terminal, so that the diode, the switching element, and the reactor are electrically connected to form a boost chopper circuit that boosts DC power supplied to the inverter, and
a resistor is connected with the main circuit between the first terminal and the third terminal when the second terminal is connected to the first terminal, so that the diode, the switching element, and the resistor are electrically connected to form a brake circuit that consumes regenerative power generated by the motor.
2. The power conversion device according to claim 1, wherein the main circuit includes an inrush current prevention circuit that prevents inrush current from being supplied to a smoothing capacitor smoothing a DC voltage applied to the inverter.
3. The power conversion device according to claim 2, wherein the inrush current prevention circuit of the main circuit is provided closer to the rectifier circuit than the second terminal of the positive-side power supply path.
4. The power conversion device according to claim 2, wherein the inrush current prevention circuit of the main circuit is provided closer to the inverter than the first terminal of the positive-side power supply path.
5. The power conversion device according to claim 2, wherein the inrush current prevention circuit of the main circuit is provided on the negative-side power supply path.
6. The power conversion device according to claim 1, wherein at least one among the diode and the switching element is formed from a wide band gap semiconductor.
7. The power conversion device according to claim 6, wherein the wide band gap semiconductor is silicon carbide, a gallium nitride-based material, or diamond.
8. A power conversion device comprising:
a main circuit including:
a rectifier circuit to rectify alternating current supplied by an AC power source,
an inverter to drive a motor,
a first diode and a second diode, cathodes of which are connected to a positive-side power supply path formed between the rectifier circuit and the inverter,
a first switching element that is connected between a negative-side power supply path formed between the rectifier circuit and the inverter and an anode of the first diode,
a second switching element that is connected between the negative-side power supply path formed between the rectifier circuit and the inverter and an anode of the second diode,
a first terminal that is provided on the positive-side power supply path,
a second terminal that is provided on a portion of the positive-side power supply path closer to the rectifier circuit than the first terminal and is disconnected from the first terminal,
a third terminal that is led from a connection point between the first diode and the first switching element, and
a fourth terminal that is led from a connection point between the second diode and the second switching element;
a reactor connected with the main circuit between the second terminal and the third terminal; and
a resistor that is connected with the main circuit between the first terminal and the fourth terminal and is connected in series with the second diode,
wherein the first diode, the first switching element, and the reactor form a boost chopper circuit that boosts DC power supplied to the inverter, and
the second diode, the second switching element, and the resistor form a brake circuit that consumes regenerative power generated by the motor.
9. The power conversion device according to claim 8, wherein the main circuit includes an inrush current prevention circuit that prevents inrush current from being supplied to a smoothing capacitor smoothing a DC voltage applied to the inverter.
10. The power conversion device according to claim 9, wherein the inrush current prevention circuit of the main circuit is provided closer to the rectifier circuit than the second terminal of the positive-side power supply path.

11. The power conversion device according to claim 9, wherein the inrush current prevention circuit of the main circuit is provided closer to the inverter than the first terminal of the positive-side power supply path.

12. The power conversion device according to claim 9, wherein the inrush current prevention circuit of the main circuit is provided on the negative-side power supply path.

13. The power conversion device according to claim 8, wherein at least one among the diode and the switching element is formed from a wide band gap semiconductor.

14. A power conversion device comprising:
a main circuit including:
a rectifier circuit to rectify alternating current supplied from an AC power source;
an inverter to drive a motor;
a diode, an anode of which is connected to a negative-side power supply path formed between the rectifier circuit and the inverter;
a switching element that is connected between a positive-side power supply path formed between the rectifier circuit and the inverter and a cathode of the diode;
a first terminal that is provided on the negative-side power supply path;
a second terminal that is provided on a portion of the negative-side power supply path closer to the rectifier circuit than the first terminal and is configured to be directly connected to or disconnected from the first terminal by closing or opening the portion of the negative-side power supply path between the second terminal and the first terminal, respectively; and
a third terminal that is led from a connection point between the diode and the switching element,
wherein a reactor is connected with the main circuit between the second terminal and the third terminal when the second terminal is disconnected from the first terminal, so that the diode, the switching element, and the reactor are electrically connected to form a boost chopper circuit that boosts DC power supplied to the inverter, and
a resistor is connected with the main circuit between the first terminal and the third terminal when the second terminal is connected to the first terminal, so that the diode, the switching element, and the resistor are electrically connected to form a brake circuit that consumes regenerative power generated by the motor.

15. The power conversion device according to claim 14, wherein the main circuit includes an inrush current prevention circuit that prevents inrush current from being supplied to a smoothing capacitor smoothing a DC voltage applied to the inverter.

16. The power conversion device according to claim 15, wherein the inrush current prevention circuit of the main circuit is provided closer to the rectifier circuit than the second terminal of the negative-side power supply path.

17. The power conversion device according to claim 15, wherein the inrush current prevention circuit of the main circuit is provided closer to the inverter than the first terminal of the negative-side power supply path.

18. The power conversion device according to claim 15, wherein the inrush current prevention circuit of the main circuit is provided on the positive-side power supply path.

19. The power conversion device according to claim 14, wherein among the first diode, the second diode, the first switching element, and the second switching element, at least the second switching element is formed of a wide band gap semiconductor.

20. The power conversion device according to claim 19, wherein the wide band gap semiconductor is silicon carbide, a gallium nitride-based material, or diamond.

21. A power conversion device comprising:
a main circuit that includes a rectifier circuit to rectify alternating current supplied from an AC power source and an inverter to drive a motor,
wherein the main circuit includes:
a first diode and a second diode, anodes of which are connected to a negative-side power supply path formed between the rectifier circuit and the inverter,
a first switching element that is connected between a positive-side power supply path formed between the rectifier circuit and the inverter and a cathode of the first diode,
a second switching element that is connected between the positive-side power supply path formed between the rectifier circuit and the inverter and a cathode of the second diode,
a first terminal that is provided on the negative-side power supply path,
a second terminal that is provided on a portion of the negative-side power supply path closer to the rectifier circuit than the first terminal and is disconnected from the first terminal,
a third terminal that is led from a connection point between the first diode and the first switching element,
a fourth terminal that is led from a connection point between the second diode and the second switching element,
a reactor that is provided between the second terminal and the third terminal, and
a resistor that is provided between the first terminal and the fourth terminal,
wherein the first diode, the first switching element, and the reactor form a boost chopper circuit that boosts DC power supplied to the inverter, and
the second diode, the second switching element, and the resistor form a brake circuit that consumes regenerative power generated by the motor.

22. The power conversion device according to claim 21, wherein the main circuit includes an inrush current prevention circuit that prevents inrush current from being supplied to a smoothing capacitor smoothing a DC voltage applied to the inverter.

23. The power conversion device according to claim 22, wherein the inrush current prevention circuit of the main circuit is provided closer to the rectifier circuit than the second terminal of the negative-side power supply path.

24. The power conversion device according to claim 22, wherein the inrush current prevention circuit of the main circuit is provided closer to the inverter than the first terminal of the negative-side power supply path.

25. The power conversion device according to claim 22, wherein the inrush current prevention circuit of the main circuit is provided on the positive-side power supply path.

26. The power conversion device according to claim 21, wherein among the first diode, the second diode, the first switching element, and the second switching element, at least the second switching element is formed of a wide band gap.

27. The power conversion device according to claim 26, wherein the wide band gap semiconductor is silicon carbide, a gallium nitride-based material, or diamond.

\* \* \* \* \*